(12) United States Patent
Chown

(10) Patent No.: US 7,359,644 B2
(45) Date of Patent: Apr. 15, 2008

(54) OPTOELECTRONIC MODULE WITH INTEGRATED LOOP-BACK CAPABILITY

(75) Inventor: David Chown, Ipswitch (GB)

(73) Assignee: Avago Technologies FIBER IP (Singapore) Pte. Ltd., Singapore (SG)

( * ) Notice: Subject to any disclaimer, the term of this patent is extended or adjusted under 35 U.S.C. 154(b) by 772 days.

(21) Appl. No.: 10/617,113

(22) Filed: Jul. 10, 2003

(65) Prior Publication Data

US 2004/0105613 A1 Jun. 3, 2004

(30) Foreign Application Priority Data

Jul. 11, 2002 (EP) .................................. 02254891

(51) Int. Cl.
*H04B 10/24* (2006.01)
(52) U.S. Cl. ...................................... 398/136; 398/137
(58) Field of Classification Search ........ 398/135–139, 398/22

See application file for complete search history.

(56) References Cited

U.S. PATENT DOCUMENTS 4,874,218 A * 10/1989 Bowen et al. ................. 385/16
4,910,727 A * 3/1990 Fussganger ................. 398/139
4,982,083 A * 1/1991 Graham et al. ......... 250/227.11

FOREIGN PATENT DOCUMENTS

EP 0661571 7/1995
GB 2191356 A 9/1997

OTHER PUBLICATIONS

Patent Abstracts of Japan Publication No. JP 05 029987, 1993.
"Electrically Switchable Mirrors And Optical Components Made From Liquid-Crystal Gels", Hikmet et al., Nature, vol. 392, No. 6675, 1998.
"Micromachining For Optical And Optoelectronic Systems", Proceedings of the IEEE, vol. 85, No. 11, 1997.
"Silica-Based Planar Lightwave Circuits", Proceedings of the IEEE, Journal of Selected Topics In Quantum Electronics, vol. 4, No. 6, 1998.

* cited by examiner

*Primary Examiner*—Leslie Pascal

(57) ABSTRACT

An optoelectronic module includes an optical radiation source having associated an output transmission path for an output optical radiation generated by the source as well as an optical radiation detector having associated an input transmission path for an input optical radiation to be detected by said detector. The module includes, as an integral part thereof, a loop-back arrangement selectively activatable to cause the output optical radiation generated by the source to at least partly propagate from the output transmission path towards the input transmission path, whereby the optical radiation generated by the source is directed towards the optical detector (R) to be detected thereby.

8 Claims, 5 Drawing Sheets

Fig_2a
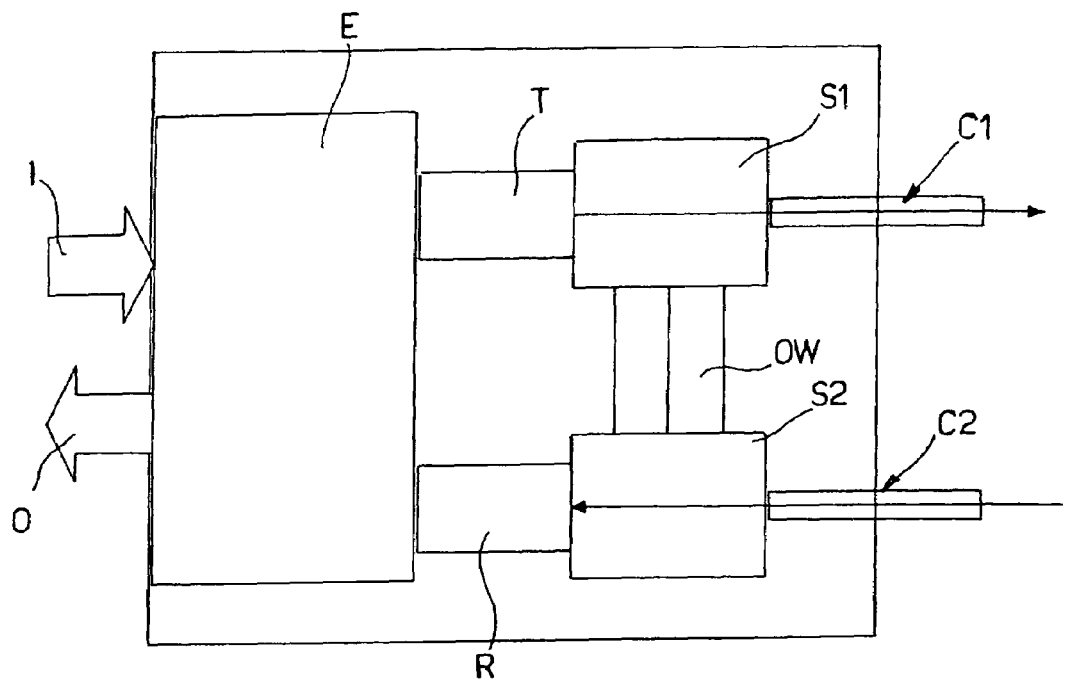
Fig_2b
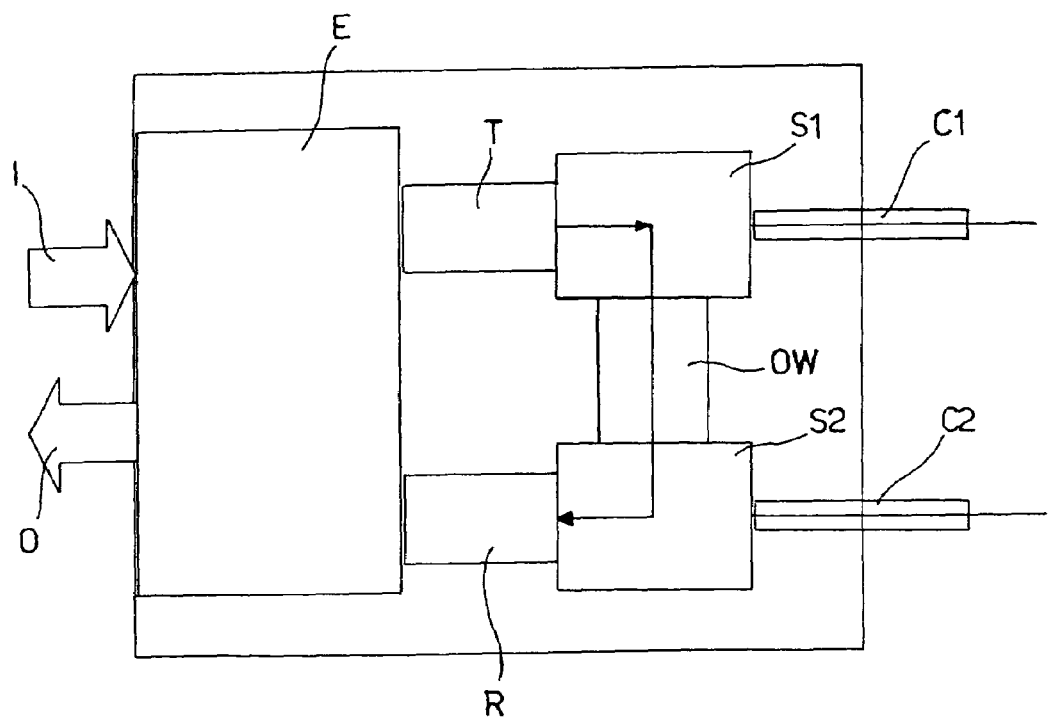

Fig_3a
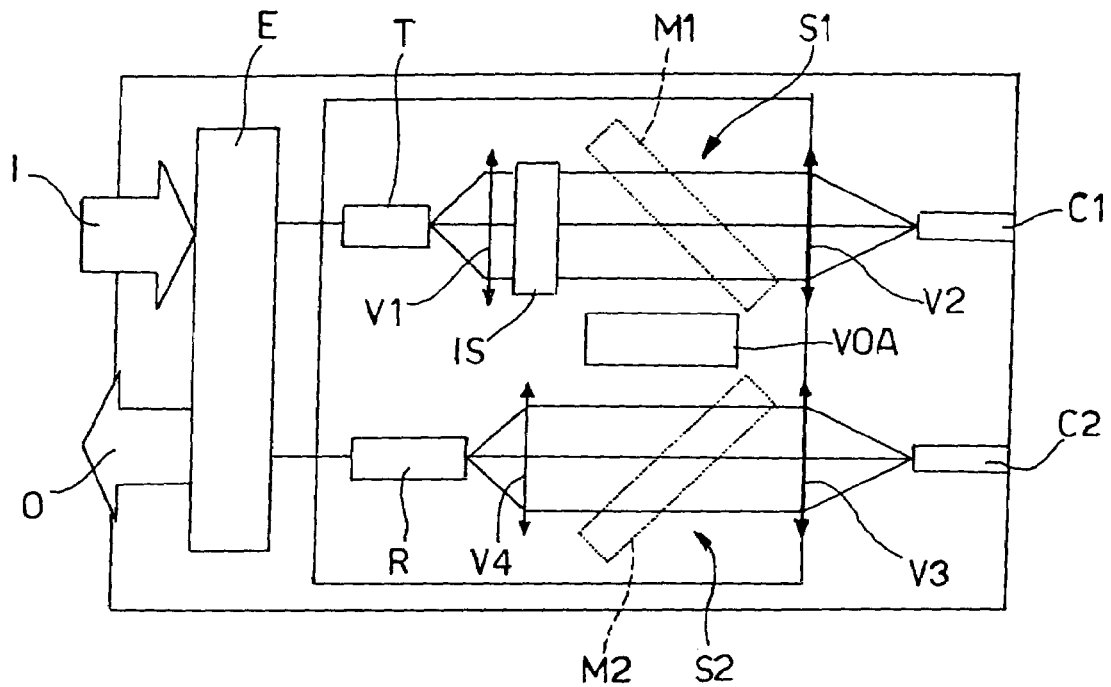
Fig_3b
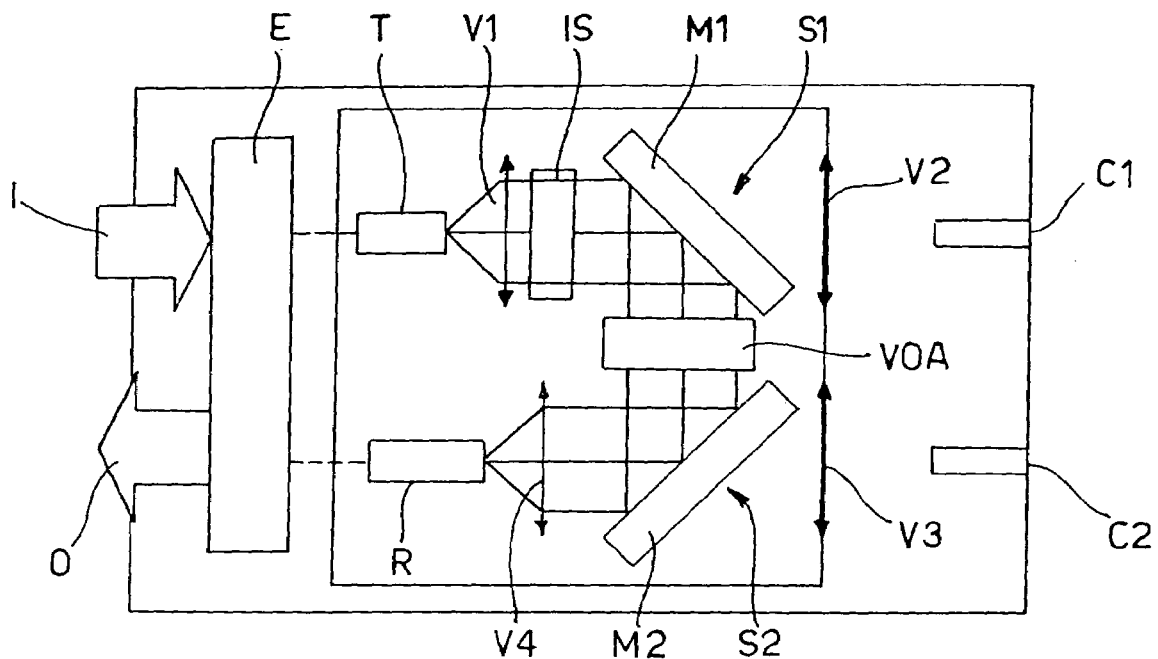

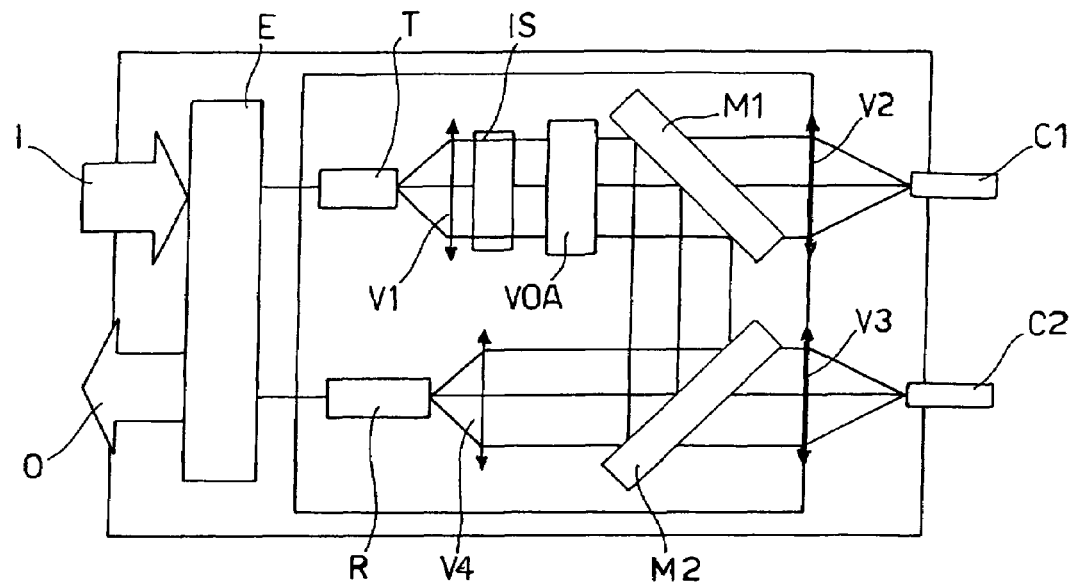
Fig_4
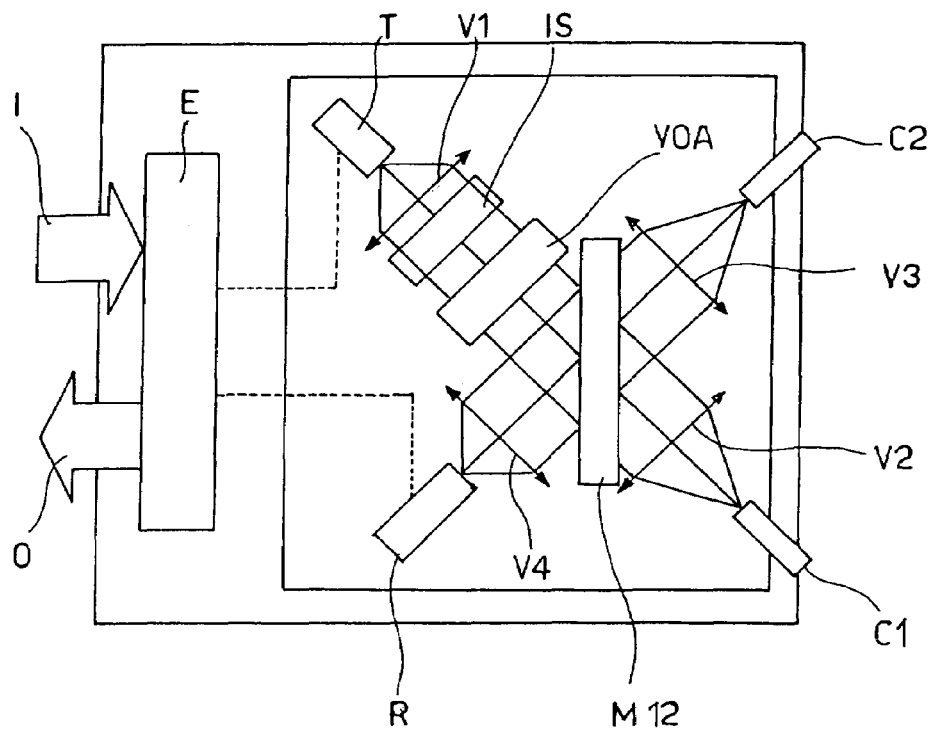
Fig_5

Fig_6
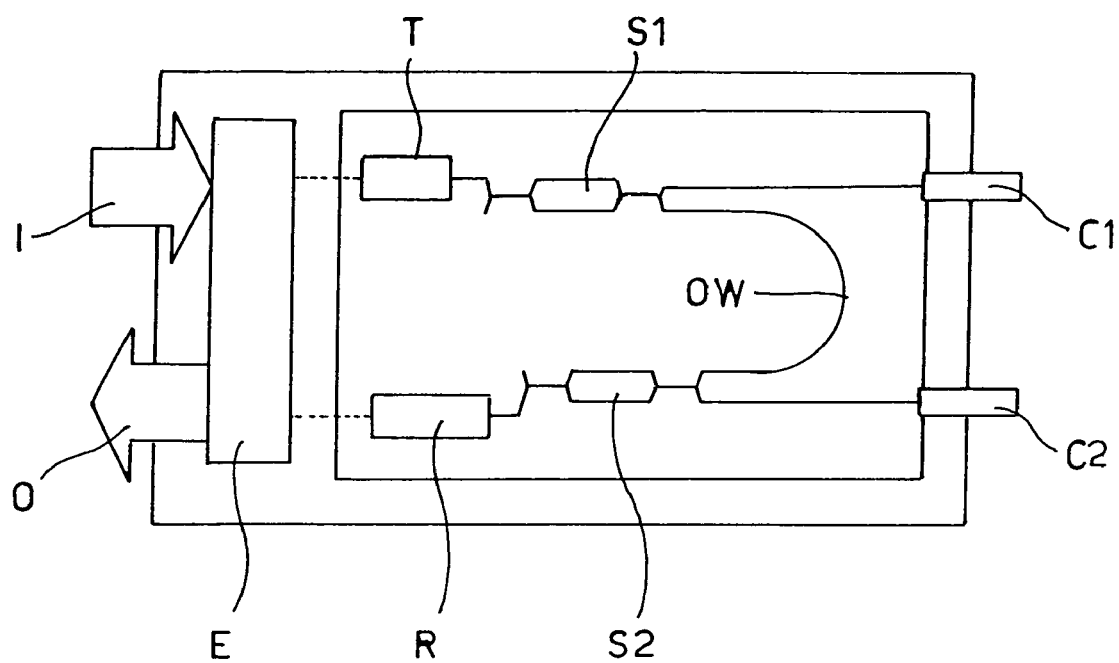

OPTOELECTRONIC MODULE WITH INTEGRATED LOOP-BACK CAPABILITY

BACKGROUND OF THE INVENTION

1. Field of the Invention

The present invention relates to optical telecommunication systems and, more specifically, is related with monitoring performance of such systems.

2. Brief Description of Related Developments

In optical telecommunication systems, bit error ratio (BER) and uptime are important measures of the quality of the system. For example, some system elements are required to have uptimes of 99.995% or 99.999%, including both planned and unplanned downtime.

An important way of ensuring high uptime values is to continually monitor the performance of the system elements to locate faults, allowing them to be put right quickly, and to identify defects before they become faults allowing them to be corrected without any unplanned downtime.

A way of monitoring the performance of system elements is by loop-back testing. Such a testing technique provides for a signal destined for a remote location to be instead directed to a nearby receiver; in the case of a transceiver, the signal launched from its transmitter may be returned to its receiver. Often the signal is attenuated to simulate the losses in the optical telecommunication system.

Generally, loop-back testing requires a technician to physically remove the connectors of the optical telecommunication system and replace them with a so-called patchcord, or the connectors of a variable optical attenuator (VOA). The system can then be tested in the loop-back condition and finally the patchcord, or the connectors of the VOA, can be removed and the system connectors replaced.

FIG. 1 shows a transceiver module including transmitter and receiver sub-modules T and R, as well as the associated control electronics E integrated into a housing H to transmit digital input signals I and receive digital output signals O via an optical communication system connected to the housing H via a transmitter connector C1 and a receiver connector C2.

This arrangement is thoroughly conventional in the art and does not require to be described in detail herein.

FIG. 1 shows a typical loop-back testing condition for the system in question where the optical telecommunication system has been disconnected and replaced by a patchcord arranged to receive light from the transmitter T via the connector C1 and re-direct it to the receiver R via the connector C2.

The patchcord typically includes a length of an optical fibre F (currently designated loop-back fibre), possibly including a variable optical attenuator or VOA that attenuates the light. Resorting to such an arrangement requires a technician to physically remove the connectors of the optical telecommunication system and replace them with the patchcord. The system can then be tested in the loop-back condition and finally the patchcord can be removed and the system connectors replaced.

This is a laborious and time-consuming process.

The need is therefore felt for solutions overcoming the disadvantages of the prior art considered in the foregoing.

SUMMARY OF THE INVENTION

According to the present invention such an object is achieved by means of an optoelectronic integrated loop-back arrangement as called for in the claims that follow.

The module of the invention includes, as an integral part thereof, a selectively activatable loop-back arrangement. Preferably, the loop-back arrangement includes one or more internal optical switches adapted to connect the transmitter and receiver included in the module to the optical telecommunication system, in which case the transceiver module functions as a standard transceiver module. Alternatively, the loop-back arrangement can connect the transmitter to the receiver to allow loop-back testing. The loop-back arrangement can be controlled remotely over the digital interface to the transceiver. The intervention of a technician is thus no longer required and loop-back testing can be performed in a quick and cheap manner.

BRIEF DESCRIPTION OF THE DRAWINGS

The invention will now be described, by way of example only, with reference to the annexed drawings, wherein:

FIGS. 2a and 2b show the general arrangement of a loop-back testing facility according to the invention with reference to current operation of the telecommunication system and to the testing phase, respectively, FIGS. 3a and 3b illustrate in greater detail an optoelectronic circuit layout adapted for use in certain embodiments of the invention, FIGS. 4 to 6 refer to various further alternative embodiments of the invention.

DETAILED DESCRIPTION OF THE PREFERRED EMBODIMENT

Figure 1:
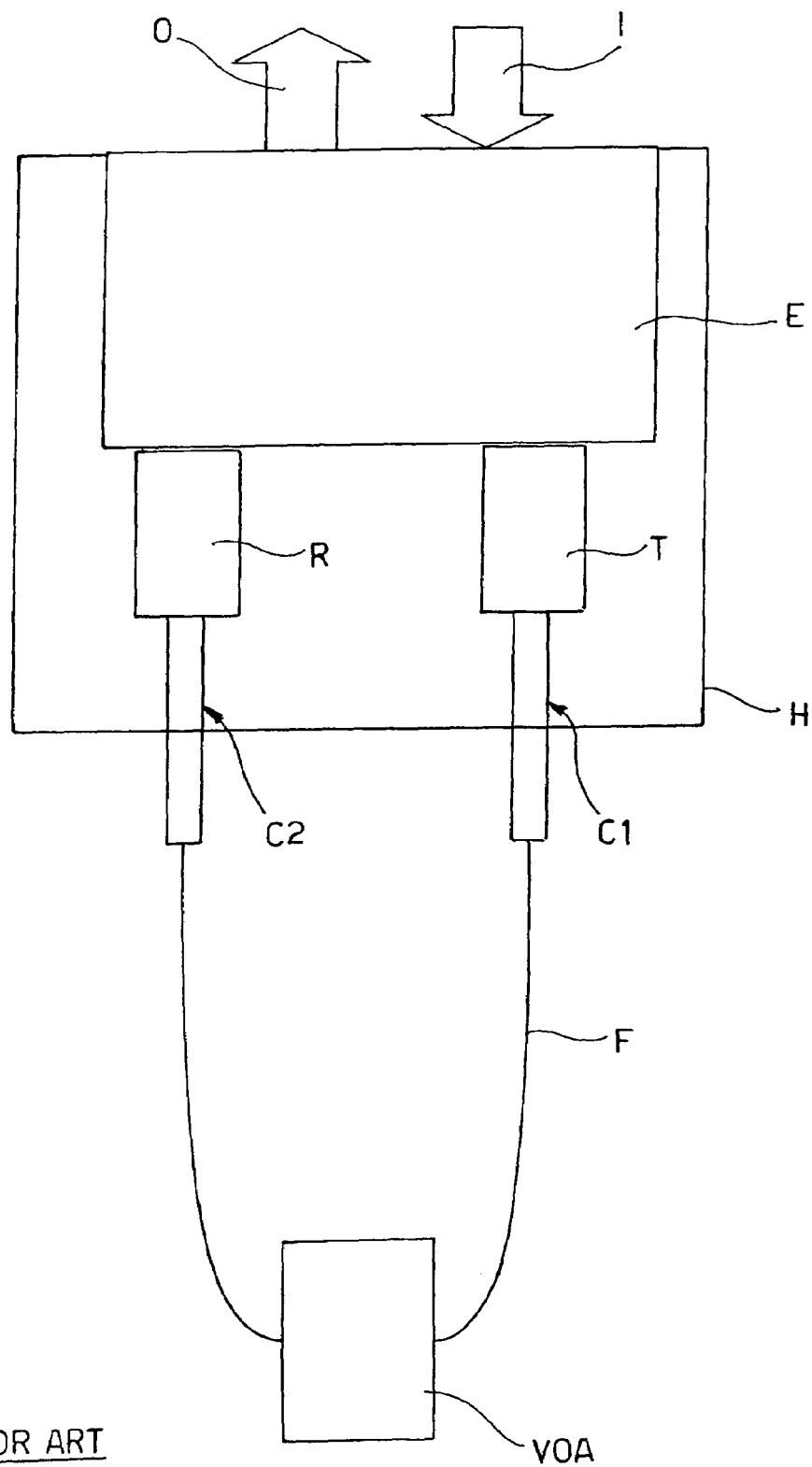
FIG. 1, relating to the prior art, has been already described in the foregoing.

Elements/parts identical or equivalent to those already referred to in connection with FIG. 1 have been indicated throughout FIGS. 2 to 6 using the same references, thus making it unnecessary to identify and describe those elements/parts again.

FIGS. 2a and 2b show schematically a transceiver module with integrated optical switches S1 and S2. The switches S1 and S2, preferably together with a length of an optical waveguide OW extending between the switches S1 and S2, are adapted to selectively define a loop-back circuit connecting the transmitter T to the receiver R.

Specifically, in the condition shown in FIG. 2a, the optical switches S1 and S2 are set to allow propagation of optical radiation:

from the transmitter T into the optical telecommunication system via the connector C1, and from the optical communication system into the receiver R via connector C2.

In the operating condition shown in FIG. 2b, the optical radiation from transmitter T, instead of being directed towards connector C1, is switched via the optical switch S1 over the optical waveguide OW and on into the receiver R via the optical switch S2.

FIGS. 3a and 3b, that essentially correspond to FIGS. 2a and 2b, respectively, show in more detail a transceiver module with integrated optical switches S1, S2 and a loop-back circuit associated therewith.

In this embodiment, light from the transmitter T (typically a laser source) is collimated via an optical system such as a lens V1 to be then propagated through an (optional) isolator IS arranged at the upstream of the loop-back arrangement and then focused through a further lens V2 into the connector C1 to be propagated into the optical communication system (not shown).

Similarly, light received from the optical telecommunication system via the connector C2 is collimated and then focused via further lenses V3 and a lens V4 into the receiver R (this is typically an opto-electrical converter such as a photodiode or a phototransistor).

In a first embodiment, the optical switches essentially comprise mirrors M1 and M2 adapted to be selectively positioned in the transmitter collimated beam and the receiver collimated beam to reflect the light from the transmitter laser T to the receiver photodetector R providing a loop-back mode.

An optional, preferably variable optical attenuator VOA is positioned between the mirrors M1 and M2 to attenuate the light.

Propagation of light from the mirror M1 to the mirror M2 can be unguided (that is not through an optical waveguide proper), the variable optical attenuator VOA being in any case arranged to be interposed in the optical path from mirror M1 to mirror M2.

It will be appreciated that the representation of the mirrors M1 and M2 in shadow lines in FIG. 3a may be purely notional in that—in the operating condition shown therein—the mirrors M1 and M2 may in fact be moved away from the propagation path between the lenses V1 and V2 and the propagation path between lens V3 and lens V4.

Any mechanical actuator known in the art can be utilised for moving the mirrors M1 and M2 between a first "passive" i.e. non-reflecting condition shown in FIG. 3a and a second "active" i.e. reflecting condition shown in FIG. 3b where the mirror M1 actually prevents radiation from laser source T from propagating towards the lens V2 and the connector C1.

In the operating conditions shown in FIG. 3b such radiation is reflected from the mirror M1 towards the variable optical attenuator VOA (if present) and then towards the mirror M2 to be then reflected back towards the photodetector R through the lens V4.

The art of micro-machining provides several mechanisms adapted for the purpose indicated, thus making it unnecessary to provide a detailed discussion herein. Specifically, mechanisms that utilize sliding actuators are well known to those of skill in the art of micro machining. In addition, the mirrors M1, M2 can be positioned on "flip-up" or rotary actuators.

For a more detailed discussion of these techniques, reference may be had to Ming C. Wu, "Micromachining for optical and optoelectronic Systems", IEEE 85, no. 11, pp 1833-1856, 1997.

Those of skill in the art will also appreciate that alternative embodiments of either or both mirrors M1 and M2 may not provide for such mirrors being rendered selectively movable between a "passive" position where the mirror is disengaged (i.e. displaced) with respect to the optical path of propagation from the source T and the receiver R (e.g. FIG. 3a) and an "active" position where the mirror does intercept such an optical path (e.g. the position shown in FIG. 3b). For instance, either or both of the mirrors M1 and M2 can be implemented in the form of mirrors adapted to be selectively switched between a first "passive" state where they do not exhibit any appreciable reflective effect (thus permitting optical radiation from the source T and/or towards the receiver R to freely propagate therethrough) and a second "active" state where the mirror exhibits a reflective surface adapted to reflect radiation from the transmitter T towards the receiver R. Selectively activatable mirrors of this kind are known in the art as witnessed e.g. by Hikmet, R. A. M., Kemperman, H., Electrically switchable mirrors and optical components made from liquid-crystal gels, *Nature, Volume* 392, Issue 6675, 1998, Pages 476-479. The general layout shown in FIG. 3b lends itself to another embodiment of the invention, wherein the mirrors M1 and M2 can be realised in the form of fixed, partially silvered mirrors that allow e.g. 96% straight through coupling and 4% reflection, that is mirrors having a high straight through coupling/reflection ratio. By "high", a ratio is meant herein of the order of e.g. 20 or more.

Having regard to the straight through coupling value indicated, the main signal paths from the transmitter T to the connector C1 and from the connector C2 to the receiver R are little impaired by the presence of the mirrors M1 and M2.

Even though relatively minor (e.g. 4% reflection) the reflection at the mirror M1 causes a portion of the radiation generated by the transmitter T to be reflected towards the variable optical attenuator VOA. Any radiation passing through the variable optical attenuator may thus be directed towards the mirror M2. Again, even though relatively minor (e.g. 4% reflection), the reflection at the mirror M2 causes a portion of the radiation from the variable optical attenuator VOA to be reflected by the mirror M2 towards the receiver R.

A loop-back path is thus established from the transmitter T to the receiver R which has a loss of 0.002 or 26 dB (mirrors S1 and S2), plus the loss of the variable optical attenuator VOA. This loss can be selectively adjusted to be high (say >25 dB) under normal operation and low (say <2 dB) under loop back test operation.

When the loss of the variable optical attenuator VOA is adjusted to be high, the overall loss of the loop-back path is very high (e.g. in the excess of 50 dB), so that no appreciable level of optical radiation from the transmitter T reaches the receiver R.

Conversely, when the loss of the variable optical attenuator VOA is adjusted to be low, the overall loss of the loop-back path is in the range of 28 dB. Under these conditions, a level of optical radiation from the transmitter T reaches the receiver R that is high enough to enable loop-back testing to be carried out in a thoroughly satisfactory manner by simply ensuring that no interfering optical radiation from outside reaches the receiver R through the connector C2 while testing is being performed.

This technique, based on the recognition that the path loss capability of a transceiver might typically be of the order of 30 dB from the transmitter T to the receiver R, avoids moving parts; only the VOA's attenuation changes which could be e.g. a liquid crystal cell.

FIG. 4 shows a further alternative embodiment where, instead of being interposed between the mirrors M1 and M2 as shown in FIG. 3, the variable optical attenuator VOA is arranged in the propagation path between the transmitter T and the mirror M1. This is preferably achieved by interposing the variable optical attenuator VOA between the isolator IS (or the lens V1) and the mirror M1.

The arrangement shown in FIG. 4 has the advantage that the variable optical attenuator VOA can control the light intensity both when propagated into the optical telecommunication system as well as in the loop-back mode.

FIG. 5 shows another alternative embodiment wherein the transmitter or source T plus the connector C1, on the one hand, and the connector C2 plus the receiver R, on the other hand, form two rectilinear propagation paths arranged in a cross-wise pattern. The two propagation paths thus defined cross at a position where a single reflective mirror M12 may be located by being selectively displaced between a "passive" and an "active" position. Alternatively, the mirror M12 may be of the kind adapted to be alternatively and selectively rendered transparent and reflective as discussed in the foregoing.

When the mirror M12 is in the "passive" state, optical radiation generated from the laser source T is propagated through the lens V1, the isolator IS and the variable optical attenuator VOA, to traverse the mirror M12 and reach the lens V3 to be focused into the connector C1. Similarly, incoming radiation from the connector C2 passes through the lens V3 as well as the mirror M12 to reach the lens V4 to be focused onto the photodetector R.

When the mirror M12 is in the "active" reflective state, optical radiation from the laser source T, instead of being propagated through the mirror towards the lens V2 and the connector C1, is reflected by the mirror M12 towards the lens V4 and the photodetector R to complete the loop-back path.

FIG. 6 shows still another embodiment where the switches S1 and S2 as well as the loop-back optical waveguide OW are integrated in a planar lightwave circuit (PLC).

PLCs are well known and are described e.g. in "Silica-based single-mode waveguides on silicon and their application to guided-wave optical interferometers", Takato, N., Jinguji, K., Yasu, M., Toba, H., Kawachi, M; Journal of Lightwave Technology, Volume 6 Issue 6, June 1988, Pages 1003-1010; "Recent progress on silica-based thermooptic switches 1999, Pages 485-486; "Silica-based planar lightwave circuits"; Himeno, A., Kato, K., Miya, T; IEEE Journal on Selected Topics in Quantum Electronics; Volume 4 Issue 6; November-December 1998; Pages 913-924.

Of course, without prejudice to the basic principle of the invention, the details of construction and the embodiments may widely vary with respect to what has been described and illustrated purely by way of example, without departing from the scope of the present invention. Also, it will be appreciated that, according to the current meaning in the art, designations such as "optical", "light" and so on are in no way restricted to the sole domain of visible light radiation. These designations do in fact apply to the whole of the wavelength domains adapted for use in optical communications, including e.g. the UV and IR domains.

What is claimed is:

1. An optoelectronic module, comprising:
   an optical radiation source having associated an output transmission path for an optical radiation generated by said source;
   an optical radiation detector having associated an input transmission path for said optical radiation to be detected by said detector;
   the module comprising, as an integral part thereof, a loop-back arrangement selectively activatable to cause said optical radiation generated by said source to at least partly propagate from said output transmission path towards said input transmission path,
   whereby said optical radiation generated by said source is directed towards said optical detector to be detected thereby, said loop-back arrangement comprising:
   first and second loop-back elements, said first loop-back element adapted to have a first surface reflectively interposed in said output transmission path to reflect said optical radiation generated by said source towards said second loop-back element;
   said second loop-back element adapted to have a second surface for reflectively receiving said optical radiation reflected by said first loop-back element and directing said reflected radiation towards said optical detector;
   an optical attenuator arranged to be traversed by said optical radiation propagating from said source towards said optical detector, wherein said optical attenuator is a variable optical attenuator adapted to be selectively switched between at least a first, high loss condition, wherein said variable optical attenuator substantially prevents propagation of said optical radiation from said source towards said detector and a second, low loss condition, wherein said variable optical attenuator permits propagation of said optical radiation from said source towards said detector.

2. The module of claim 1, wherein said source has associated an optical isolator arranged at the upstream end of said loop-back arrangement.

3. The module of claim 1, wherein at least one of said first and second loop-back elements includes a mirror having a reflective surface adapted to be selectively moved between a first position, wherein said reflective surface is located away from said at least one of said output transmission path and said input transmission path and a second position wherein said reflective surface intercepts at least one of said output transmission path and said input transmission path.

4. The module of claim 1, wherein at least one of said first and second loop-back elements includes a stationary mirror selectively switchable between a first condition, wherein said mirror is substantially transparent to said optical radiation propagating therethrough and a second condition, wherein said mirror exhibits said surface reflectively interposed in at least one of said output transmission path and said input transmission path.

5. The module of claim 1, wherein said optical attenuator is interposed between said first and second loop-back elements.

6. The module of claim 1, wherein said first and second loop-back elements are mirrors having a high straight through coupling/reflection ratio.

7. The module of claim 1, wherein said optical attenuator is a interposed between said source and said first loop-back element.

8. The module of claim 1, wherein said loop-back arrangement is in the form of a planar lightwave circuit.

* * * * *

UNITED STATES PATENT AND TRADEMARK OFFICE
CERTIFICATE OF CORRECTION

PATENT NO. : 7,359,644 B2  Page 1 of 1
APPLICATION NO. : 10/617113
DATED : April 15, 2008
INVENTOR(S) : David Chown It is certified that error appears in the above-identified patent and that said Letters Patent is hereby corrected as shown below:

Column 6, Line 53, Claim 7, after "is" delete "a".

Signed and Sealed this

Twenty-sixth Day of October, 2010

David J. Kappos
*Director of the United States Patent and Trademark Office*